Dec. 22, 1936.  H. L. BERNARDE  2,065,421
ELECTRICAL MEASURING AND REGULATING SYSTEM
Filed July 1, 1932  5 Sheets-Sheet 1

WITNESSES:
Fred C. Williams
F. J. Hicks

INVENTOR
Henry L. Bernarde
BY
ATTORNEY

Dec. 22, 1936.   H. L. BERNARDE   2,065,421
ELECTRICAL MEASURING AND REGULATING SYSTEM
Filed July 1, 1932   5 Sheets-Sheet 2

WITNESSES:
Fred. C. Wilham
F. J. Hicks

INVENTOR
Henry L. Bernarde
BY
ATTORNEY

Dec. 22, 1936.   H. L. BERNARDE   2,065,421
ELECTRICAL MEASURING AND REGULATING SYSTEM
Filed July 1, 1932   5 Sheets-Sheet 3

WITNESSES:
Fred C. Williams
F. T. Hicks

INVENTOR
Henry L. Bernarde
BY
ATTORNEY

Dec. 22, 1936.   H. L. BERNARDE   2,065,421
ELECTRICAL MEASURING AND REGULATING SYSTEM
Filed July 1, 1932   5 Sheets-Sheet 4

WITNESSES:
Fred C. Wilham
F. J. Hicks

INVENTOR
Henry L. Bernarde
BY
ATTORNEY

Dec. 22, 1936.  H. L. BERNARDE  2,065,421
ELECTRICAL MEASURING AND REGULATING SYSTEM
Filed July 1, 1932     5 Sheets-Sheet 5

WITNESSES:
Fred. C. Witham
F. J. Hicks

INVENTOR
Henry L. Bernarde
BY
ATTORNEY

Patented Dec. 22, 1936

2,065,421

UNITED STATES PATENT OFFICE 2,065,421

ELECTRICAL MEASURING AND REGULATING SYSTEM

Henry L. Bernarde, Kearny, N. J., assignor to Westinghouse Electric & Manufacturing Company, East Pittsburgh, Pa., a corporation of Pennsylvania Application July 1, 1932, Serial No. 620,387

17 Claims. (Cl. 250—41.5)

My invention relates to electronic recorders or regulators and more specifically to systems wherein a delicate measuring instrument, such as a galvanometer, is arranged to control a comparatively heavy indicating or recording instrument, or a control device such as a valve, switch, or rheostat.

In previous systems of this nature it has been necessary to use a Kelvin balance or other balancing system involving the use of numerous mechanically moving parts and electrical contacts, thereby introducing various complications and errors. Other difficulties experienced with previous systems are slow operation, mechanical friction and the tendency to overrun and hunt.

It is accordingly an object of my invention to provide an accurate recording system which is quick in its action and does not overrun or hunt, and which may be applied to the most sensitive mechanism.

A further object of my invention is to provide a recording system which is small, cheap and simple, and which is not subject to inaccuracies due to mechanical load and friction.

Another object of my invention is to provide an electronic system wherein a feeble A. C. potential derived by the movement of a delicate instrument, such as galvanometer, is amplified sufficiently to control relatively heavy apparatus.

In accordance with my invention the movement of a galvanometer controls means for deriving from an original A. C. potential a potential variable in phase and amplitude. In order to avoid interference with the delicate rotatable element of the galvanometer, various space effects are utilized for this purpose.

In one embodiment of my invention the voltage deriving means comprises a shutter which is moved by the galvanometer to control the light falling upon a photo-cell from a pair of alternately flashing lamps energized from the original A. C. source on alternate half cycles. The electrical impulses set up by the light flashes on the photo-cell will be in phase with one or the other of the half cycles of the original A. C. depending upon which beam of light is permitted to fall upon the cell, and its magnitude will vary according to the amount of light passed. In another embodiment of my invention a synchronous light-chopper is used with a steady source of light instead of the flashing lamps. Other forms of modulated light sources obviously may be used.

In another embodiment the galvanometer carries a very small pick-up coil which it rotates in an alternating field set up by the original potential. When the pick-up coil is turned in one direction from its zero position, the A. C. potential induced therein is 180° out of phase with reference to the potential which would be induced therein if it were turned in the opposite direction from its zero position. Zero position is that position of the pick-up coil where the induced voltage is actually zero.

Although the potentials set up by either voltage deriving means may be very feeble, these potentials may be sufficiently amplified by a suitable amplifier that they may be used for actuating comparatively heavy apparatus.

When the apparatus to be actuated comprises a recording or indicating element it is necessary to provide suitable arresting means for interrupting the motion of the element when it has been moved to a position which corresponds to the condition or quantity which controls the galvanometer. Otherwise the actuated element would continue to move to its extreme position. This is readily accomplished by providing a second pick-up coil on the controlled element. The second coil is connected in series-opposing relation to the first coil, and as it is rotated by the controlled element a position is reached wherein its potential is exactly equal and opposite to that induced in the first pick-up coil. The potential of the first pick-up coil being exactly balanced, the controlled element comes to rest and remains stationary until this state of equilibrium is disturbed by another movement of the first coil.

Another arrangement employed for arresting the movement of the controlled element introduces a counterpotential into the measuring circuit to thereby restore the galvanometer to zero. This may be accomplished by a potentiometer, the slide-wire contact of which is connected to the controlled element for movement therewith. A simpler method, avoiding the use of a potentiometer with its sliding contact, consists in passing the controlling current through a resistor in the galvanometer circuit in such a direction that the IR drop opposes the measuring current.

When the controlled element is only moved between two extreme positions as a switch or a valve, it is unnecessary to discontinue the actuating force in any intermediate position and the arresting means referred to above may be omitted, thereby still further simplifying the system.

The invention itself, however, both as to its organization and its method of operation, together with additional objects and advantages thereof, will best be understood from the following description of specific embodiments, when read in connection with the accompanying drawings in which.

In the drawings similar reference characters have been applied throughout to similar elements in the various systems and new reference characters have been applied only to new or modified elements.

Figure 1:
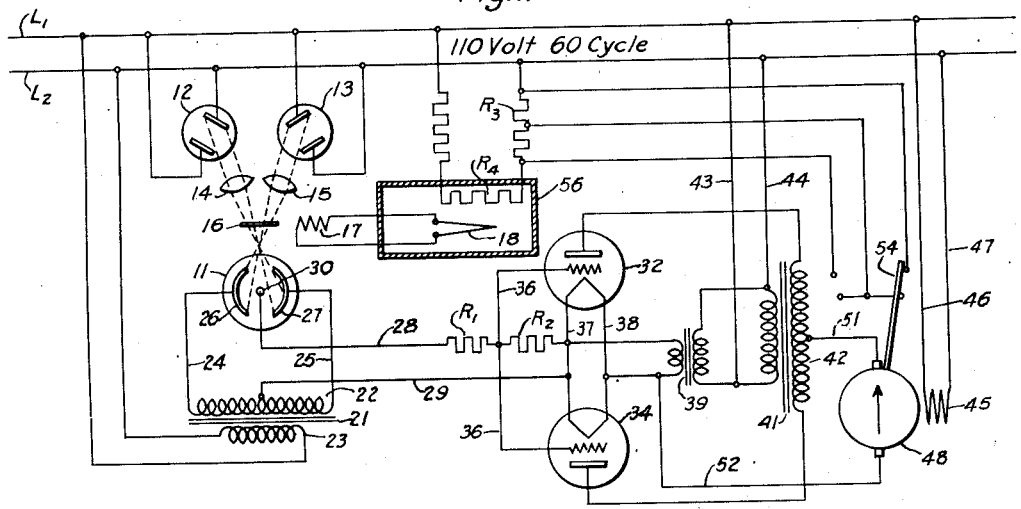
Figure 1 is a diagrammatic view of a regulating system arranged in accordance with one embodiment of my invention utilizing shutter controlled flashing neon lamps.

Referring more specifically to the drawings, the apparatus shown in Fig. 1 comprises a full wave or two plate photo-cell tube 11 which is exposed to the light from suitable light sources such as a pair of neon tubes or arc lamps 12 and 13 through a suitable optical system comprising a pair of condensing lenses 14 and 15. The optical system and the lamps are relatively so arranged that light is alternatively flashed on the photo-cell 11 first from one lamp and then from the other. This is accomplished by so positioning the lamps and the optical system that the light from only one plate of each lamp will be directed upon the photo-cell. In the neon lamps the plates which are exposed to the photo-cell are connected to opposite sides of the A. C. line conductor L1 and L2 from which they are energized whereby they glow alternatively as they are charged positively. Although the second plate in each tube will glow on the opposite half cycle its light will not impinge upon the photo-cell. Hence, on successive half cycles light will be passed alternately through the two optical systems to the photocell.

In order to control the impingement of the light upon the photo-cell a shutter 16 is interposed in the beams of light projected by the optical systems. The shutter 16 is carried and actuated by the moving element of a sensitive measuring device 17 such as a galvanometer, and in the normal or zero position thereof it intercepts both light beams. Means is provided for energizing the galvanometer 17 in accordance with the variable quantity or condition to be measured, recorded or controlled. The galvanometer may, for example, be connected to a thermocouple 18, as shown, if it is desired to measure, record or control temperatures.

For energizing the full-wave photocell 11, a transformer 21 having a center tapped secondary 22 may be utilized. The terminals of the secondary winding 22 are connected by suitable conductors 24 and 25 to the plates 26 and 27 of the photo-cell, and conductors 28 and 29 are extended respectively from the cathode 30 of the photocell and the center tap of the secondary winding 22 to control a pair of vacuum tubes 32 and 34. The vacuum tubes 32 and 34 may be of the type known as power grid glow tubes. The primary winding 23 of the transformer 21 is energized directly from the main line conductors L1 and L2.

The cathode 30 of the photo-cell 11 is connected to the grids of the tube S through a resistor R1 which may have a resistance of about one megohm or more. The grids are connected directly together by a conductor 36 extending therebetween. A very high resistance resistor R2 of about 10 megohms is connected between the cathodes and the grids of the tubes whereby the latter will normally acquire a high negative charge which will prevent current flow in the plate circuit of either tube.

The conductor 29 extending from the center tap of the secondary winding 22 is connected directly to the cathodes of the tubes which may comprise filaments connected in parallel by conductors 37 and 38 and heated by current from a suitable transformer 39.

The plates of the grid glow tubes are energized from the main source of alternating current in such a manner that their polarities are opposite at any given instant while each is alternately positive and negative on the successive half cycles of the energizing A. C. potential. Although this might be accomplished by connecting the plates directly to opposite sides of the line and using a center tapped resistor for the common return to the cathodes, in the preferred embodiment of my invention a separate transformer 41 having a center tapped secondary 42 is provided for this purpose. The primary winding of the plate transformer 41 is energized from the A. C. line in parallel with the primary of the filament transformer 39 through conductors 43 and 44. The terminals of the secondary winding of the plate transformer are each connected directly to the plate of one of the respective tubes 32 and 34.

The device to be controlled by the system has two windings one of which 45 is connected to the A. C. line through suitable conductors 46 and 47 for direct energization therefrom. The second winding 48, which may be termed the armature winding, is connected by conductors 51 and 52 between the cathodes of the tubes and the center tap on the secondary winding of the transformer which energizes the plates.

The controlled device may, for example, be a relay for controlling some element which has two positions such as a switch or valve. If the galvanometer is responsive to temperature, as previously assumed, the switch or valve may control the admission of heating current or fuel to maintain the normal and desired temperature conditions. In the system disclosed, the motor controls a switch 54 which is connected for shunting out various portions of a resistor R3 in series with a heating resistor R4 in an oven 56 with the thermocouple 18.

Figure 14:
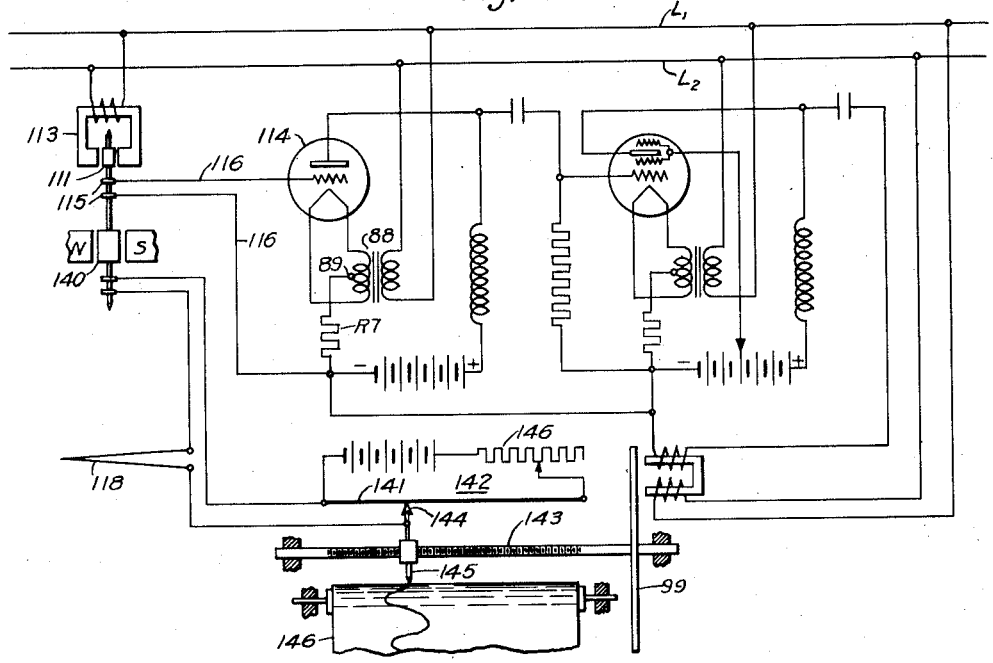
Fig. 14 is a diagrammatic view showing how a graphic recorder actuated by such a system may control a slide wire potentiometer to interpose a counterpotential in the measuring circuit of the galvanometer for balancing it back to zero when the pen has been moved to its proper position.
Figure 15:
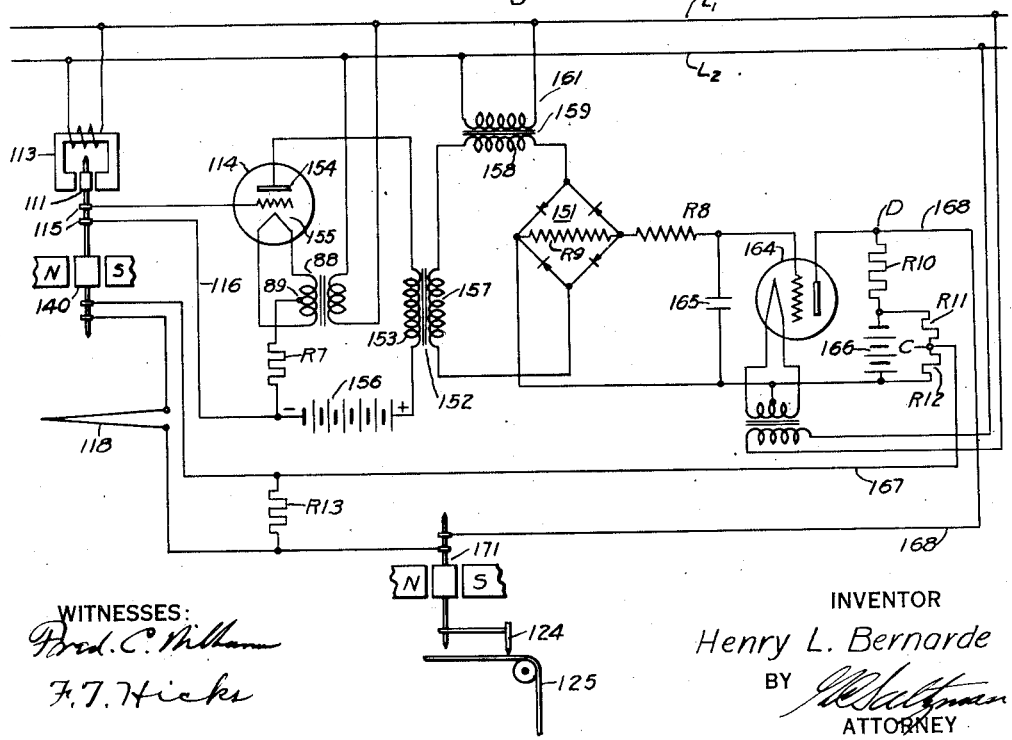
Fig. 15 is a diagrammatic view showing a system provided with a special amplifier for actuating a graphic milliammeter of the D'Arsonval type which is so connected that its controlling current passes directly through a suitable resistor in the measuring circuit of the galvanometer for balancing it.

The controlled element may be a motor which itself directly actuates a control element, or it may actuate a pen or marker on a chart for recording. When used for recording, suitable arresting means must be provided, as shown in Figs. 14, 15 and subsequently set forth, for interrupting the actuation of the controlled element when its movement is proportional to the variation of the quantity or condition which initiated the movement. When utilized for controlling or regulating, the responsive member may swing from one extreme position to the other, and the system itself automatically restores the variable condition to normal which in turn thereby restores the galvanometer or detecting device and the system to its normal or zero condition.

The above described system of Fig. 1, may be most readily understood by considering an assumed operation thereof.

Under normal conditions the galvanometer shutter 16 is so disposed that both light beams are obstructed and they do not shine upon the photocell 11. The grids of the vacuum or grid-glow tubes are then so biased that no current flows in the plate circuits as the plates are alternately charged positively. Hence, although one winding 45 of the controlled device is energized directly from the line, the armature winding 48 is not energized at this time and no torque is developed. An alternative condition is that wherein the grid bias is such that current flows in the plate circuit of each tube 32 and 34 every time its plate goes positive. Under this condition the armature winding 48 of the device receives an equal impulse during each half cycle but, since these are direct current impulses always in the same direction and the field set up by the other winding 45 is an alternating field, the result is that torque is developed in opposite directions during each half cycle and the net result is zero torque for a complete cycle.

Assume that a variation of temperature conditions now causes the galvanometer shutter 16 to be moved to the right and permits light from the neon lamp 12 on the left hand side to shine upon the photocell 11. Since each optical system is arranged to gather light from only one plate of each neon lamp, it will be apparent that the light admitted to the photocell from the left hand neon lamp 12 will be a series of flashes occurring synchronously with the positive charging of the exposed plate.

If the plates of the photo-cell are so connected that the left-hand plate 26 thereof is positive during those half cycles when the light shines on the photo-cell 11, current will then flow from the plate 26 to the cathode 30 thereof through a circuit which extends by way of the conductor 28 through the resistors R1 and R2 to the filament circuit of the tubes and thence returning to the center tap of the secondary winding 22 of the photo-cell transformer through the interconnected conductor 29.

The grids of the tubes 32 and 34 being connected at a point intermediate the resistors R1 and R2 are biased positively by the IR drop in the high resistance resistor R2 which is connected to the filaments of the tubes. The connections are so made that the plate of the upper tube 32 is charged positively during the same half cycle and current consequently flows in the plate circuit of the upper tube. This impulse of current necessarily flows through the armature winding 48 of the controlled device, as indicated by the arrow, since said winding is interposed in the plate circuit of both tubes in the common connection between the filaments and the center tap of the plate transformer secondary winding 42.

During the next half cycle the other plate of the left-hand neon lamp 12 glows but its light does not shine upon the photo-cell 11 since it faces in the opposite direction and is not exposed to the optical system. Consequently the grids of the vacuum tubes 32 and 34 assume their normal negative bias during the second half cycle and current does not flow in the plate circuit of the lower tube 34, although it is then charged positively. There is therefore no current impulse in the armature winding 48 of the controlled device during this second half cycle.

During the next half cycle the operation of the first half cycle is repeated, as above set forth, and another impulse of current passes through the armature winding 48 of the controlled device, as indicated by the arrow.

The net result is that a succession of direct current impulses passes through the armature winding 48 of the controlled device and since this occurs on alternate half cycles when the other winding 45 is always energized in a certain direction a resultant torque is created which drives the armature in a definite direction.

Figure 2:
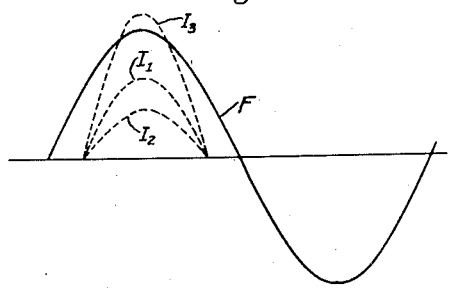
Figs. 2 and 3 are diagrams illustrating the theory of operation thereof.

This condition is graphically illustrated in Fig. 2 wherein curve F represents the field set up by the winding of the controlled device which is connected directly to the line; curve I1 represents the current and light of the left-hand neon lamp; I2 represents the current through the photo-cell and the voltage between the grid and cathode of the grid-glow tube; curve I3 represents the current in the armature of the controlled device and the X axis represents time. The desired control is thus automatically effected and as conditions are restored to normal the system returns to its normal or zero condition.

If a temperature variation occurs in a direction such that the galvanometer shutter 16 is moved to the left, the light from the right hand neon lamp 13 will be permitted to flash upon the photo-cell 11 and the operation is substantially the same as that previously set forth, except that the direct current impulses which pass through the armature winding 48 of the motor or relay are 180 degrees out of phase in relative time relation and therefore the cooperative field is always in the opposite direction when the direct current impulses pass. The resulting torque is therefore in the opposite direction and the controlled device operates in the reverse direction. This condition is illustrated in Fig. 3 which shows the corresponding relation of the armature current relative to the field.

Figure 3:
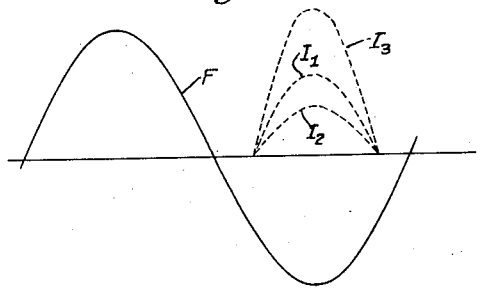

Although the relative phase relation of the quantities involved in the operation of the system is shown graphically in Figs. 2 and 3 it should be understood that the magnitude of the armature current will vary according to the amount of light passed by the shutter which thereby determines by its movement not only the direction but also the speed of operation of the motor.

Figure 4:
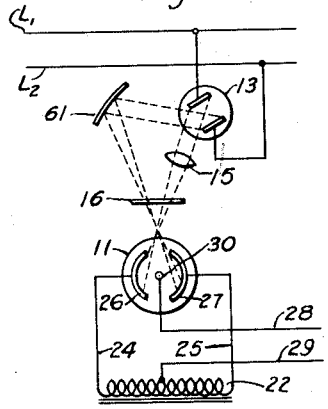
Fig. 4 is a diagrammatic view illustrating an arrangement of a single neon tube for deriving an additional potential from the A. C. line.

It is also possible to omit one of the neon lamps and obtain the same operations from a single neon lamp. This may be accomplished by so arranging the optical systems by substituting a reflector 61 for one lens that the light from both plates of a single neon lamp is gathered and directed toward the photo-cell as separately directed beams, as shown in Fig. 4.

Figure 5:
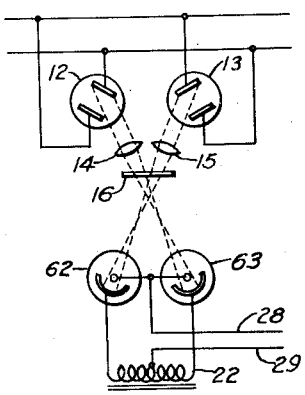
Fig. 5 is a modified circuit utilizing two neon lamps and two photo-cells.

If desired the full-wave photo-cell 11 may be replaced by a pair of single photo-cells 62 and 63 which are properly matched or compensated and have their cathodes interconnected by a common conductor, as shown in Fig. 5.

Figure 6:
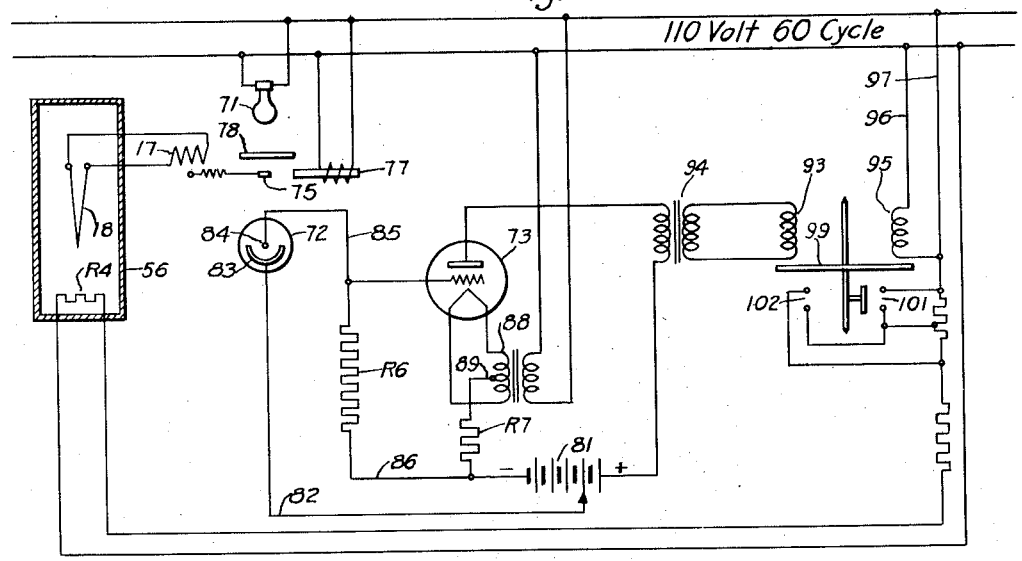
Fig. 6 is a diagrammatic view of an embodiment of my invention wherein a synchronous light-chopper has been substituted for the flashing neon lamps.
Figure 7:
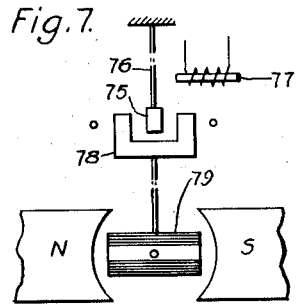
Fig. 7 is an elevational view showing the galvanometer actuated shutter in cooperative relation to the vibrating shutter or synchronous light-chopper.

In another form of my invention shown in Figs. 6 and 7, it is only necessary to use a single source of constant light 71, a photo-cell 72 and a vacuum tube 73. In this system a light-chopper, comprising a shutter 75 mounted on a polarized member 76, is vibrated in synchronism with the original A. C. potential by an electromagnet 77 energized from the A. C. line. If desired a polarized synchronous motor may drive the chopper. The light chopper is interposed between the light source 71 and the photo-cell 72, within a beam of light defined by a framing shutter 78. Since the vibrating shutter 75 normally vibrates within the cross-section of the light beam it does not normally affect the total amount of light shining on the photo-cell 72, and hence does not cause electrical impulses to be passed thereby.

The framing shutter 78 is movably mounted, as shown in Fig. 7, in connection with the moving element 79 of a galvanometer, so that the movement of the latter in response to a certain varying condition will move the framing shutter 78 and shift the light beam. In the normal or zero position of the galvanometer 79 the framing shutter 78 is so positioned that the chopper 75 vibrates entirely within the light beam. Hence, as the chopper 75 vibrates to the left, for example, the light is increasing on the right as much as it is decreasing on the left and the total amount of light shining on the photo-cell remains constant. For maximum sensitivity, a definite relation should exist between the size of the galvanometer shutter 78 and the amplitude of vibration of the light-chopper 75. Assuming the width of the latter to be unity, the length of the block of light, that is the width of the light beam framed by the galvanometer shutter 78, should be three. The width of each side of the shutter operated by the galvanometer should also be one. The amplitude of vibration of the light-chopper 75 should be one and the limit of travel of the galvanometer shutter 78 should be one.

As shown in Fig. 6, the polarizing circuit for the photo-cell 72 extends from the positive terminal of a battery 81, or other source of current, by way of a conductor 82 to the plate 83 of the photo-cell 72, thence from the cathode 84 by way of a conductor 85, through a resistor R6 of high resistance and thence by conductor 86 to the battery 81. Directly controlled by the photo-cell 72 is a vacuum tube 73 which has its filament energized from a transformer secondary winding 88 having a center tap 89 by which it is connected through a biasing resistor R7 to the conductor 86, the negative terminal of the battery 81 and the photo-cell resistor R6. The positive end of the photo-cell resistor R6 is connected to the control grid of the tube 73 whereby the grid potential and the current in the plate circuit is controlled in accordance with the IR drop in the resistor. A single source of current 81 may be used for energizing the plates of both the photo-cell and the vacuum tube as shown.

The actuated device may, for example, comprise a relay of the induction disk type having two windings or it may be a dynamometer type of relay or motor. One of the windings 93 is coupled to the plate circuit of the tube through a suitable transformer 94. The other winding 95 is connected through suitable conductors 96 and 97 directly to the A. C. line from which it is continuously excited.

Figure 8:
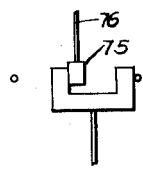
Figs. 8, 9, 10 and 11 are diagrammatic views illustrating the theory of operation thereof.

Assume that in the operation of the device the quantity or condition controlling the galvanometer 17 causes it to move the framing shutter 78 to the right as represented in Fig. 8. As the vibrating light chopper 75 moves to the right, the light striking the photo-cell does not change since the area on one side becomes larger as the area on the other side becomes smaller. Therefore, during this half cycle, the light, and the current through the photo-cell 72 remain constant as indicated graphically in Fig. 9 wherein curve M represents the oscillatory movement of the chopper and curve I represents the photocell current.

Figure 9:
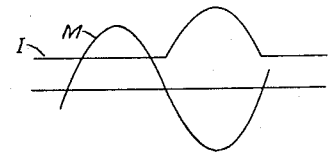

During the next half cycle the light chopper 25 moves toward the left, and as it moves beyond the left hand boundary of the light beam, as shown in Fig. 8, the area or amount of light is increasing. The photo-cell 72 will then permit an increased current impulse to flow as indicated in Fig. 9 thereby increasing the IR drop in the resistor R6. This increases the positive bias of the grid of the vacuum tube 73, which will in turn permit an increased current impulse to flow in its plate circuit. The fluctuation of the direct current in the plate circuit of the vacuum tube 78 and the primary winding of the coupling transformer 94 induces an impulse of current in the secondary winding of the transformer and energizes the connected winding 93 of the induction relay. This current impulse will create a torque impulse tending to drive the actuating element or disk 99 in a given direction depending upon the direction of the field at that instant set up by the other relay winding 95 by current from the A. C. line.

During the return vibration of the light chopper 25 to the right the light will remain constant, as above set forth, and when it again vibrates to the left another current impulse will be induced in the relay winding which will cause another torque impulse.

A succession of torque impulses will thus be created which will all be in the same direction, for a given displacement of the framing shutter 78, since they will occur in synchronism with alternate half cycles of the alternating current supplied by the line. The actuable member 99 will thus be moved to close either pair of contacts 101 or 102 to accomplish any desired regul and as conditions are restored to normal the system returns to its normal or zero condition. If a recorder or indicator is driven by the motor 99, suitable arresting means must be provided as previously set forth with reference to the system shown in Fig. 1.

Figure 10:
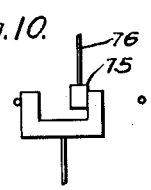
Figure 11:
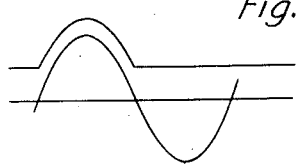

If the galvanometer is influenced by an opposite variation of the controlling conditions, the framing shutter 78 will thereby be moved to the left as indicated in Fig. 10. In this position the light remains constant when the chopper 75 vibrates to the left and increases when it moves to the right whence the current impulses passed by the photo-cell 72 will be shifted 180 degrees in phase relatively to the vibration of the chopper, as represented by the curve shown in Fig. 11. The current impulses successively induced by the vacuum tube in the associated relay winding will then be shifted 180 degrees in phase relation to the field which is set up by the other winding excited from the A. C. line, and the actuable member will be actuated in the reverse direction to automatically effect the necessary regulation through any valve, switch or other control device associated therewith. It is to be understood that in any of the above light responsive systems the galvanometer actuated shutter may be replaced by a mirror if it is desired to reflect rather than obstruct the light.

Figure 12:
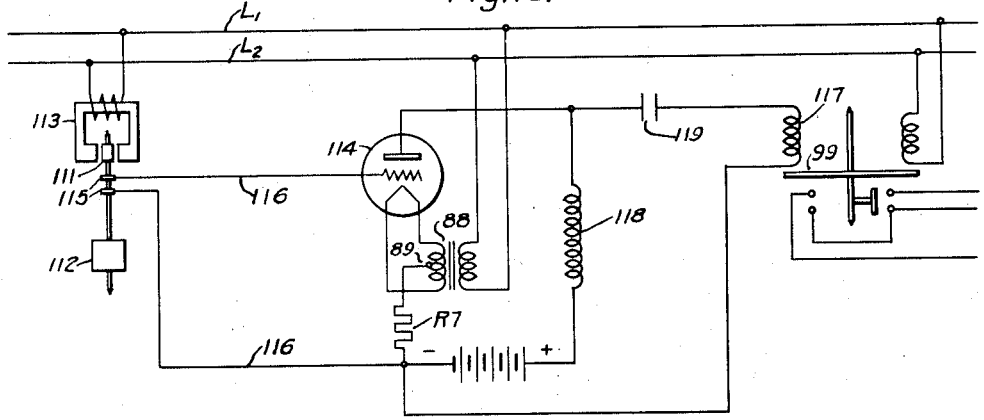
Fig. 12 is a diagrammatic view showing a modification wherein the derivation of the additional voltage is accomplished by a small pick-up coil rotated by the galvanometer in an alternating field set up by the original potential.

Although the systems above described are specifically adapted to utilize light responsive means, various other space effects than light may be utilized to advantage in my system. For example, in Fig. 12 I have diagrammatically illustrated a system wherein electromagnetic induction is utilized by mounting a small pick-up coil 111 on the moving element of the galvanometer, voltmeter, pressure meter or any other meter which is responsive to a quantity or condition which is to be controlled. A suitable field structure 113 which is energized from the A. C. line L1 L2 is so positioned relative to the pick-up coil 111 that the latter will be in zero inductive relation thereto when the condition to be maintained is at its correct value.

When the condition varies, the meter 112 rotates the pick-up coil 111 into inductive relation in the field. By connecting the pick-up coil 111 through suitable pig tail or slip ring connections 115 and conductors 116 to the input of a suitable amplifier tube 114 the induced potentials may be amplified without drawing any appreciable current from the coil. It is therefore possible to utilize a very small pick-up coil which does not interfere with the operation of the meter.

The output of the amplifier is coupled to one coil 117 of an induction disk motor through any suitable coupling such as impedance coil 118 and condenser 119 whereby the amplified potentials are impressed thereon. A second coil of the induction disk motor is connected directly to the A. C. line from which it is continuously excited and when both coils are energized the simultaneous reaction of the two windings creates a torque in the disk thereby causing it to rotate.

The direction of the torque reacting on the disk of the motor depends upon the relative phase relation of the alternating currents traversing the coils which in turn depends upon the inductive relation of the pick-up coil in its surrounding field. The phase relation of the induced potentials varies 180 degrees depending upon which direction the pick-up coil is turned from its zero inductive position which thereby determines the direction of rotation of the motor. The magnitude of the induced potentials, and hence the speed of the motor, varies according to the amount the pick-up coil is rotated from its zero position. Hence both the direction and the speed of rotation of the motor are controlled by the rotation of the small pick-up coil on the meter, and it may actuate rheostats, valves, relays or other control elements for controlling the condition to be maintained. A commutator type motor may be substituted for the disk induction motor if desired.

When it is desired to utilize the motor for driving a pen or marker to make a record on a chart, it is necessary to provide some means for arresting the motion of the motor when the movement of the marker has been proportional to the variable condition which initiated the operation.

Figure 13:
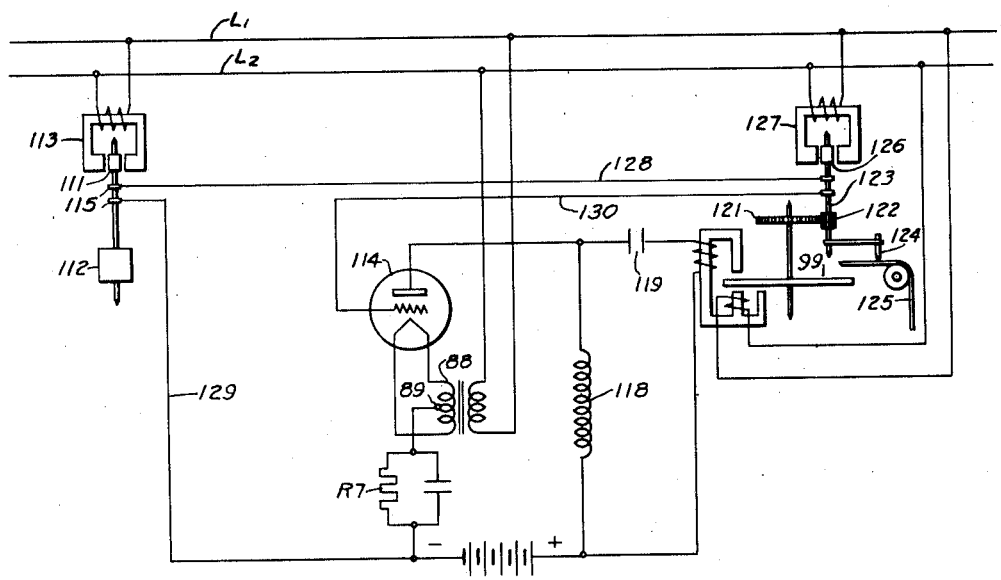
Fig. 13 is a diagrammatic view showing a recording system wherein a second pick-up coil is rotated by the pen to provide a balancing potential which is equal and opposed to that induced in the first pick-up coil when it has been moved to the proper position.

The actuation of a recorder is shown in Fig. 13 wherein the motor disk 99 is connected through suitable gears 121, 122 to rotate a second shaft 123 and move a pen 124 over a chart 125. A second pick-up coil 126 also is mounted on the second shaft 123 of the motor. Disposed in inductive relation adjacent thereto is a field structure 127 which is excited from the A. C. line. The second pick-up coil 126 is connected in a series circuit 128, 129, 130 in opposed relation with the first pick-up coil 111, and the resulting potential which is impressed on the input of the amplifier is the difference, or algebraic sum of the two. The pick-up coils and their associated field structures may be similar so that their induced potentials will be equal and the potential impressed on the amplifier will be zero when the coils are rotated to equal angular positions.

Hence, any rotation of the first coil 111 by the meter 112 will cause the motor to run, but as the second coil 126 approaches a position which corresponds to that of the first coil the induced potentials will gradually approach equality and the motor 99 will gradually come to rest when the pen 124 reaches the correct position on the chart. Such arresting means is equally applicable to systems which are controlled either by electrical or non-electrical meters, and since the motor is brought to a gradual stop, the system will not overrun and hunt. Furthermore, when the galvanometer is deflected a large amount, and the difference of potentials induced in the pick-up coils 111 and 126 is large, the motor will run at a high speed thus making the instrument quick-acting.

It is to be noted that it is not absolutely necessary to operate my system from a 110-volt 60-cycle source. The system may in fact be actuated with greater accuracy by alternating current of a higher frequency which may be supplied by a tube oscillator, or other means.

It will be understood that additional stages of amplification may be provided with suitable power tubes to supply the amount of output power required. For example, for this purpose a very satisfactory arrangement in the amplifier comprises a high mu 224 type tube the control grid of which is connected to the pick-up coil, and the plate circuit of which is coupled to the grid of a power tube, preferably of the pentode type.

Referring to Fig. 14, instead of determining the position of the pen by balancing out the alternating induced potentials in the pick-up coil by potentials induced in a second pick-up coil, it is possible when the measuring meter is an electrical instrument such as a galvanometer, to balance the current in the galvanometer measuring circuit and thereby restore the galvanometer and the pick-up coil to zero position when the marker has moved to its proper position. This may be readily accomplished by so connecting the slide wire resistor 141 of a potentiometer 142 into the galvanometer input circuit in series with the thermo-couple that its IR drop will oppose the measuring voltage from the thermo-couple 118 or other controlling element which influences the galvanometer 140.

In this arrangement a threaded shaft 143 is driven by a motor and adjusts the movable brush 144 of the potentiometer accordingly as it simultaneously moves the pen 145 across the chart 146. The potentiometer is manually so adjusted by a variable resistor 146 that the counter-potential interposed in the galvanometer circuit will be equal to the potential impressed thereon by the thermo-couple 118, or other controlling element, when the pen 145 has been moved to its proper position on the chart. The galvanometer 140 will then return to its zero position thereby turning the small pick-up coil 111 to its zero inductive position and stopping the motor 99.

Whenever the galvanometer turns from its zero position, potentials are induced in the pick-up coil 111 which cause the motor 99 to run in one direction or the other, depending upon the direction in which the pick-up coil was rotated. As the pen is moved across the chart, the potentiometer brush 144 is simultaneously moved in the same direction whereby it gradually varies the counter-potential interposed by the potentiometer in the proper direction to gradually balance out the measuring potential impressed on the galvanometer circuit by the thermocouple 118 or other measuring device. The galvanometer 140 gradually returns to its zero position and the motor 99 gradually comes to rest when the pen 145 has been moved to its proper position. Since the arresting means is effective to stop the motor gradually, the system will not overrun and hunt but is stable in operation.

In the use of two phase devices such as the induction disk motor or the relays utilized in my system, the maximum torque will be produced when the fluxes produced by the two sets of coils in the device are 90 degrees apart. This phase relation may be adjusted anywhere in the system by the use of condensers, inductances and resistances in the usual manner. The phase shifting apparatus may be inserted at some point in the amplifier, at the pick-up point, or even in the motor coils themselves.

I have found it possible to entirely eliminate the potentiometer with its battery and sliding brush attached to the pen and to directly balance out the current in the galvanometer circuit by feeding back the current from the circuit of the graphic recording instrument. The preferred embodiment of such a system is diagrammatically represented in Fig. 15.

The output of the first amplifier tube 114 in this system feeds into a full wave rectifier 151 through a transformer 152 one terminal of the primary winding 153 of which is connected to the plate 154 of the tube. The other terminal of the primary winding is connected to the cathode 155 through a suitable B battery 156, or source of current for the plate. The secondary winding 157 of the transformer is connected to the rectifier 151 in series relation with the secondary winding 158 of a second transformer 159 which has its primary winding connected directly to the 60 cycle A. C. line conductors L1, L2. The secondary winding of the second transformer is designed to generate about 25 volts. The movement of the galvanometer pick-up coil 111 is so limited by stops, or in any suitable manner, that in its position of maximum angular deflection the output for the secondary 157 of the first transformer 152 is about 25 volts.

The full wave rectifier 151 may be made up of copper oxide elements and its D. C. output is applied to the grid and cathode of a second vacuum tube 164 which may be a 245 power tube. A resistor R8 of about 1 megohm is inserted in the grid connection and a condenser 165 of about 4 mfd. capacity is connected between the grid and the cathode of the tube. A resistor R9 is shunted across the output terminals of the rectifier, and may have a resistance of about 50,000 ohms. A circuit extends from the plate of the tube 164 through a resistor R10 and suitable B battery 166 or other source of current to the cathode. The B source is shunted by resistors R11 and R12, and from the intermediate point C connection is made with a conductor 167 of the output circuit. The other side of the output circuit comprises a conductor 168 which joins the plate circuit at a point D between the plate and the resistor R10. Said output conductors are connected to a D. C. graphic recorder 171 through a resistor R13. The resistor R13 is included in the galvanometer input circuit in series with the thermocouples 118 or other measuring device.

A specific operation of the system may be traced as follows. Assume the temperature difference between the two ends of the thermocouple 118 to be sufficient to generate .015 volts, and also that the resistor R13 in series with the couple has a resistance of 10 ohms. To balance the .015 volts generated by the couple, a current of .0015 amperes must flow through the resistor R13. Suppose for a moment that the voltage across the 4 mfd. condenser 165, and on the grid of the associated tube 164, is such a value as to allow a current of the correct value of .0015 amperes to flow through the 10 ohm resistor R13. Under these conditions the galvanometer will be balanced and the pick-up coil will be at its zero position. But when the pick-up coil is at zero, the input to the rectifier is 25 volts. With this input the D. C. output voltage from the rectifier across the 4 mfd. condenser 165 will start to decrease, and if allowed to continue the current through the milliameter and the resistor R13 would finally become zero. The value of the resistors R10, R11 and R12 associated with the last tube is adjusted to make this possible. The moment the current through the 10 ohm resistor R13 drops slightly below .0015 amperes, the voltage across this resistor no longer balances the voltage generated by the thermo-couple 118.

Because of the above condition of unbalanced voltages, the galvanometer 140 and also the pick-up coil 111 changes the input to the rectifier, which causes the current through the resistor R13 to slowly (because of the time delay caused by the condenser 165 being charged in series with the 1 megohm resistor R8) increase to a value slightly above the correct value of .0015 amperes, which again unbalances the galvanometer and pick-up coil, but this time the unbalance is in such a direction as to bring the current slightly below the correct value of .0015 amperes.

At all times, except when the thermocouple 118 is generating zero voltage, the galvanometer 140 is oscillating a small amount and also the current through the resistor R13 and the recording milliammeter 171 is varying slightly above and below the value necessary to balance the voltage of the couple. The varying current moves the milliammeter only slightly, probably less than the width of a mark made by the pen 124, because of the greater sensitivity of the galvanometer over the milliammeter.

Figure 16:
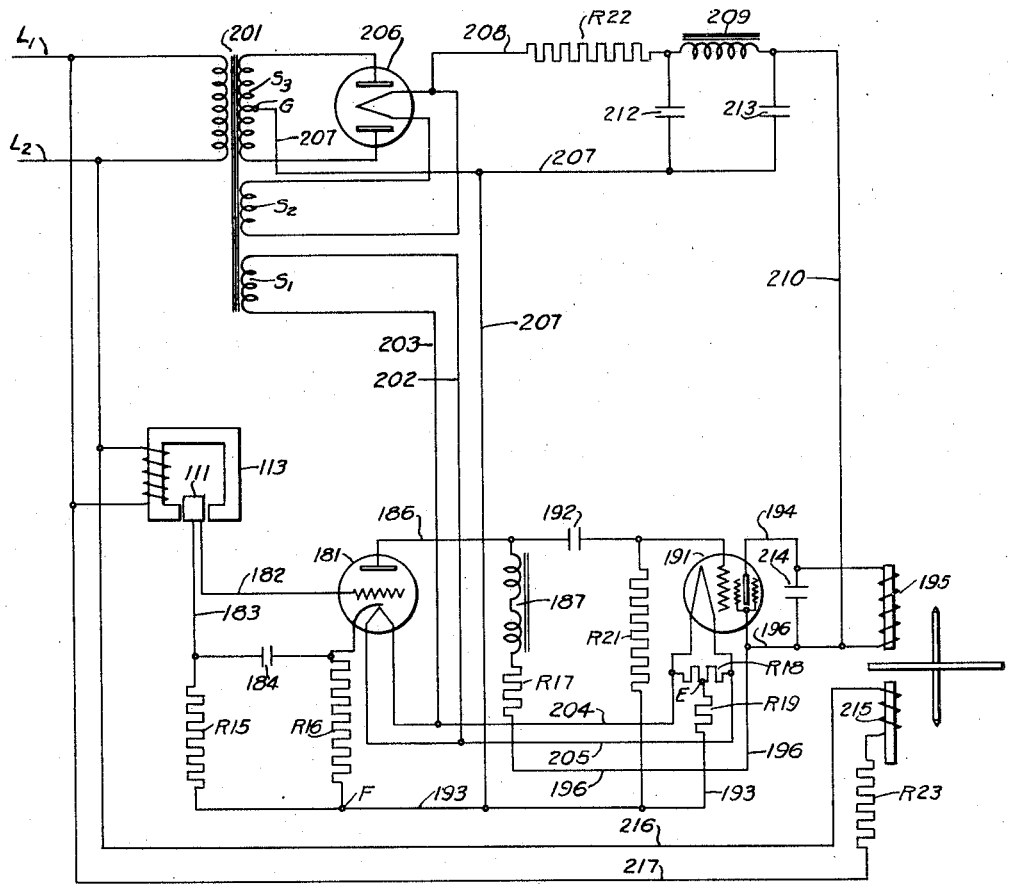
Fig. 16 is a diagrammatic view showing an amplifier and source of current suitable for use in such a system.

In Fig. 16 I have shown an amplifier suitable for use in the above systems and a power supply whereby the amplifier may be energized directly from the 110 volt 60 cycle A. C. mains. As in the systems disclosed above, a field structure 113 is excited directly from the line conductors L1 L2 and has associated therewith a pick-up coil 111 which may be mounted on the rotatable element of a galvanometer, a pressure gauge, or a meter responsive to any condition to be observed or regulated. The output from the pick-up coil is impressed upon the first tube 181 of the amplifier which is preferably a 227 high mu tube. One terminal of the coil 111 is connected directly to the grid of the tube 181 through a conductor 182 and the other terminal is connected to the cathode through a conductor 183 and a pair of resistors R15 and R16 of 100,000 and 750 ohms resistance respectively connected in series and shunted by a condenser 184 of about .25 mfd. capacity.

The output or plate circuit of the first tube 181 extends by a conductor 186 through a coupling impedance 187 of about 200 henries and a resistor R17 of about 20,000 ohms. The plate end of the circuit is coupled from the conductor 186 to the grid of the second tube 191 through a condenser 192 of about .1 mfd. capacity. The second tube 191 is preferably a 247 tube and its filament is shunted by a resistor R18 of 10 ohms which is center tapped to provide a constant potential point E for connection with the grid return circuit and the cathode of the first tube 181. An interconnecting conductor 193 extends from the center tap E of the shunting resistor R18 through a biasing resistor R19 to a point F between the two resistors R15 and R16 associated with the cathode of the first tube 181. The grid of the second tube 191 is connected to the cathode circuit conductor 193 through a resistor R21 of about 100,000 ohms resistance. The plate or output circuit of the second tube extends by way of a conductor 194 through one coil 195 of a two phase device to be actuated thereby, thence to the screen grid of the second tube and the plate circuit of the first tube by way of a conductor 196.

A power transformer 201 is directly energized from the A. C. line conductors L1, L2 and a plurality of secondary windings S1, S2 and S3 afford suitable voltages for energizing various elements of the amplifier. One low voltage secondary winding S1 is connected by suitable conductors 202, 203 directly to the filaments of the two amplifier tubes 181, 191 which are connected in parallel by suitable conductors 204, 205 whereby both are energized by alternating current of a proper voltage.

In order that suitable direct current may be supplied to the plates of the amplifier tubes a full wave tube 206 such as the type 280 is provided and its filament is energized by alternating current of a proper potential supplied by a suitable secondary winding S2 on the power transformer. A center tapped high voltage secondary winding S3 has its terminals connected to the respective plates of the rectifier tube 206, and a conductor 207 extends from the center tap G to the interconnected cathode conductor 193 of the amplifier tubes. From the filament of the rectifier tube a circuit extends to the plate circuits of the amplifier tubes through a conductor 208, a resistor R22 of about 1000 ohms, an impedance coil 209 of about 20 henries inductance, and a conductor 210 which joins the conductor 196. Large filter condensers 212 and 213 of about 8 mfd. capacity each are connected between the transformer center tap conductor 207 and the respective terminals of the impedance coil 209.

The coil of the actuated device in the plate circuit of the last amplifier tube is shunted by a condenser 214 of .5 capacity. The other coil 215 of the controlled device is connected directly to the main A. C. line conductors L1, L2 through a circuit comprising conductors 216 and 217, having a resistor R23 of about 75 ohms in series therewith to obtain the most effective phase relation between the currents in the two coils 195 and 215 for maximum torque.

The measuring device on which the pick-up coil 111 is mounted rotates the latter in one direction or the other in accordance with variations of the influencing condition. As the voltages induced in the pick-up coil 111 are impressed on the amplifier they are amplified in magnitude and excite the coil of the controlled device which is connected in the plate circuit of the last amplifier tube. The device is thus actuated in a direction which is determined by the relative phase relation of the alternating currents in the two windings of the device and at a speed which is determined by the magnitude of the A. C. potentials induced in the pick-up coil, both of which depend upon the direction and degree of rotation of the latter.

Although I have shown separate sources of current for each plate and filament in the amplifiers of many of the above systems and have represented them as batteries, this has been done merely to simplify the diagram and it is to be understood that these circuits may be energized from a B-battery eliminator as shown above in Fig. 16 or in any suitable manner.

Figure 17:
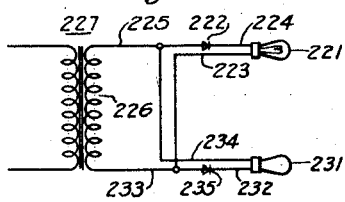
Fig. 17 is a diagrammatic view illustrating a deriving circuit which utilizes a pair of incandescent filament lamps.

I have also found it possible to utilize incandescent filament lamps in cooperation with a suitable galvanometer actuated shutter and photo-cell circuit instead of neon lamps, for deriving the potential which varies in phase and magnitude in accordance with the controlling condition. A circuit suitable for using incandescent filament lamps instead of neon discharge lamps is shown in Fig. 17. One of the lamps 221 is connected through a single wave rectifier element 222 by way of suitable conductors 223, 224 and 225 to the secondary winding of a transformer 227, the primary winding of which is connected to the supply mains. A second incandescent lamp 231 is also connected by way of conductors 232, 233 and 234 through a single wave rectifier element 235 to the secondary winding 225 of the transformer, but the rectifier elements 222 and 235 are so connected to opposite terminals of the transformer secondary winding 226 that the respective lamps associated therewith are energized alternatively on opposite half cycles.

Figure 18:
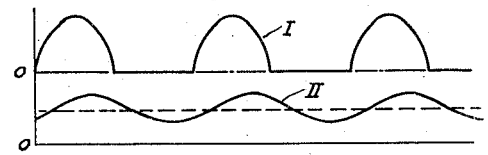
Fig. 18 is a diagram illustrating the theory of operation thereof.

The presence of the single wave rectifier element in each lamp circuit limits the current supplied to either one of the lamps to a series of D. C. impulses as diagrammatically represented by the current curve I in Fig. 18. Each lamp filament cools gradually during the half cycle when its energizing current is zero and the intensity of its emitted light gradually diminishes although it is not completely extinguished before the next succeeding D. C. impulse passes through the filament. The result is that the light from each lamp is modulated at the rate of sixty cycles instead of being flashed sixty times a second. The variation of the emitted light is represented by the curve II shown in Fig. 18 below the curve I which represents the energizing current. Equal time units are measured along the X-axis for both curves, and the zero light ordinate coincides with the X-axis. The zero current ordinate is taken along the horizontal line adjacent the current curve.

The incandescent filament lamps used are preferably 6-volt flash light bulbs and the secondary winding of the transformer is preferably designed to provide 10 volts. The bulbs are preferably filled with gas to aid in cooling the filaments. Light from the incandescent lamps may be controlled by a suitable meter actuated shutter to selectively impinge upon a single photo cell or upon either one of a pair of photo-cells as previously disclosed with reference to the flashing neon lamps.

It will be understood that the transformer may be omitted, and that the lamps may be energized through the rectifiers directly from the supply mains if the voltage is suitable for the particular lamps utilized.

It will be seen, therefore, that I have provided an electronic system utilizing various space effects wherein a delicate measuring instrument may control a graphic recorder or regulating means in accordance with certain variable conditions or quantities, that the speed and direction of operation of the system will correspond to the variation of the controlling quantity or condition, that the system will be stable and antihunting in its operation and is simple and economical in its arrangement with a minimum of moving parts and contacts.

Although I have shown and described certain specific embodiments of my invention, in compliance with the statutes, such embodiments are disclosed merely as specific examples of some of the systems wherein my invention may be applied, and I do not wish to be restricted to the specific structural details, or the specific circuit connections, voltages, frequencies, inductance, capacities and resistances therein set forth since various other modifications thereof may be effected without departing from the spirit of my invention. My invention, therefore, is not to be limited except as necessitated by the prior art and the scope of the appended claims.

I claim as my invention:

1. In combination means for deriving from an original alternating potential an additional potential variable in phase and/or amplitude according to a controlling quantity or condition comprising two independent light-emitting elements energized only on alternate half cycles, light sensitive elements, means responsive to a quantity or condition for controlling the exposure of the light sensitive elements to either of said light-emitting elements and means exposed to the influence of the original potential and the impulses induced by the actuation of said light sensitive elements.

2. In combination means for deriving from an original alternating potential an additional potential variable in phase and amplitude according to a controlling quantity or condition comprising a glow lamp energized by said original potential, said glow lamp having a pair of electrodes alternately effective to produce periodic light flashes, a pair of light sensitive elements, optical means for directing a beam of light from either electrode of said glow lamp to a corresponding one of said light sensitive means, a shutter mounted in a position for intercepting either one of said light beams, means for moving said shutter to intercept either or both of said light beams in accordance with variations of said quantity or condition and means responsive to impulses from the light sensitive elements.

3. In combination means for deriving from an original alternating potential an additional potential variable in phase and amplitude according to a controlling quantity or condition comprising a source of light, a photocell disposed adjacent thereto, a light chopper disposed therebetween, means for moving said chopper with a harmonic motion in predetermined phase relation to said original potential, a framing shutter disposed between said photocell and said light source for defining a beam of light, means for moving said shutter in accordance with a controlling condition or quantity whereby in the zero position of the shutter the light chopper moves entirely within the limits of the light beam, the total amount of light impinging upon the photo-cell remaining constant, and as the shutter is moved in either direction away from its zero position it shifts the light beam relatively to the chopper and renders the chopper effective to vary the light periodically at the extremity of its motion adjacent thereto, and means responsive to the simultaneous effects of the original potential and the derived potential.

4. In combination a light source, a photo-cell, a shutter disposed therebetween to define a beam of light, a light chopper supported in said beam from a fixed support, means for vibrating said chopper, means for moving said shutter in accordance with a variable condition or quantity whereby under certain normal conditions the chopper vibrates within the limits of said light beam or under certain respective increasing or decreasing conditions the chopper passes beyond the boundaries of the beam at one or the other respective phase of its vibration and the total light impinging upon the photo-cell is constant or varies periodically in phase and degree depending upon the variation of said quantity or condition.

5. The method of deriving from an original alternating potential an additional potential variable in phase and amplitude according to a variable quantity or condition which comprises the steps of projecting a beam of light, periodically intercepting at least a portion of the light flux of said beam at a frequency dependent upon the frequency of said original alternating potential, varying the effective area of the modulated beam in accordance with said quantity or condition, and translating fluctuations of the transmitted light of said beam into corresponding electrical pulsations.

6. A modulated light source comprising an incandescent filament lamp, a source of alternating current, a single wave rectifier, and means for connecting said lamp to said current source through said rectifier.

7. In combination, a source of alternating current, a single wave rectifier, an incandescent filament lamp, means for connecting said lamp to said source through said rectifier whereby it will be energized on alternate half cycles, a second incandescent filament lamp, a second single wave rectifier, and means for connecting said second lamp and rectifier to said current source in such relation to said first lamp that it will be energized on alternate half cycles when the first lamp is deenergized.

8. In combination a source of alternating current, a glow lamp energized therefrom comprising spaced light emitting electrodes rendered alternately luminous, a photo-cell comprising a pair of light sensitive elements each of which is disposed for exposure to a different one of said luminous electrodes, optical means for directing light along separate paths from the luminous electrodes to the respective corresponding light sensitive elements, gaseous discharge means comprising an output circuit and an input circuit, a device to be controlled, means for coupling said device with said output circuit, means for coupling said input circuit with said photo-cell, and a shutter member movable for variably restricting the transmission of light along either or both paths, whereby said device is energized by direct current impulses in synchonism with either half wave of the alternating-current source and of variable amplitude.

9. In combination a source of alternating current, a glow lamp energized therefrom comprising spaced light emitting electrodes rendered alternately luminous, a photo-cell comprising a pair of light sensitive elements each of which is disposed for exposure to a different one of said luminous electrodes, optical means for directing light along separate paths from the luminous electrodes to the respective corresponding light sensitive elements, a device to be controlled, means for energizing said device in accordance with the exposure of said photo-cell comprising a pair of gaseous discharge tubes including grid, cathode and anode members, means for coupling the grids to said photo-cell, means for energizing each of said anodes from said source, a common return connection from the anode circuits to the cathodes including said device, and means for varying said light transmission paths in accordance with a variable quantity or condition.

10. In combination a source of alternating current, light emitting means energized therefrom comprising spaced light emitting elements rendered alternately luminous by the successive half waves of the alternating current, light responsive means comprising a pair of light sensitive elements each of which is disposed for exposure to a different one of said luminous elements, a movable member for controlling the exposure of the light sensitive elements to the associated light emitting elements, a device to be actuated, and energizing means for said device controlled by said light responsive means.

11. In combination a source of alternating current, light emitting means energized therefrom comprising spaced light emitting elements rendered alternately luminous by the successive half waves of the alternating current, light responsive means comprising a pair of light sensitive elements each of which is disposed for exposure to a different one of said luminous elements, a movable member for controlling the exposure of the light sensitive elements to the associated light emitting elements, a device to be actuated, and energizing means for controlling said device in accordance with the light exposure of said light responsive means comprising a pair of gaseous discharge tubes including grid, cathode and anode members, means for coupling the grids of said tubes with said light responsive means, means for energizing each of said anodes from said source, and a common return connection from the anode circuits to the cathode including said device.

12. In combination a source of alternating current, a movable member, a device to be controlled in accordance with the movements of said member, light emitting means energized from said source comprising spaced light emitting elements rendered alternately luminous, a photo-cell comprising a cathode and a pair of anodes, optical means for directing light from the respective luminous elements to respective ones of the photo-cell anodes along separate paths adjacent said movable member whereby the movements of said member to various positions will cause it to restrict the transmission of light along either or both paths, means associated with said source for energizing said photo-cell anodes alternatively positive relative to said cathode, gaseous discharge means having input and output circuits, means for associating the input circuit with the photo-cell energizing circuit whereby voltages are applied to said input circuit in accordance with the instant characteristics of the photo-cell, means for coupling said device with said output circuit and means for energizing said output circuit from said alternating-current source.

13. In combination a movable element, a device to be controlled in accordance with the movements of said element, an alternating-current source, means energized therefrom for emitting a first series of light flashes on successive half waves of the energizing current having like polarity and a second series of light flashes on the opposite successive half waves of said energizing current, light sensitive means exposed to said light flashes, means associated with the movable element for obstructing either or both series of light flashes in accordance with the position of the element, and means responsive to said light sensitive means for energizing said device.

14. In combination a source of alternating current, means energized therefrom for producing periodic light flashes of a frequency dependent on that of said source, a movable element, a device to be controlled in accordance with the movements of said element, means actuated by said movable element for intercepting portions of said light flashes of varying magnitude and phase relation, gaseous discharge means comprising input and output circuits, means responsive to said light flashes for controlling the energization of said input circuit, means for energizing said output circuit from said alternating current source, and means for controlling said device from said output circuit.

15. In combination a source of alternating current, means energized therefrom for producing light flashes, a movable element, a device to be controlled in accordance with the movements of said element, means actuated by said movable element for intercepting portions of said light flashes of varying magnitude and phase relation, gaseous discharge means comprising input and output circuits, means responsive to said light flashes for controlling the energization of said input circuit, means for energizing said output circuit from said alternating-current source, and a pair of electromagnetic windings for actuating said device, means for energizing one of said windings from said alternating-current source and the other from the output circuit of said gaseous discharge device.

16. A normally balanced system unbalanced upon change in magnitude of a measured condition, structure adjustable to rebalance said system, a motor for adjusting said structure having windings energized by periodically varying current, a photo-cell, sources of light alternately energized and whose beams are selectively transmitted to said photo-cell depending upon the unbalance of said system, and means for amplifying the output of said photo-cell to supply current to the other motor winding whose phase relation with respect to the current in the first winding is determined by the unbalance of said system to effect rotation of said motor in a sense to restore balance.

17. A normally balanced system unbalanced upon change in magnitude of a measured condition, structure adjustable to rebalance said system, a motor for adjusting said structure having windings energized from a source of alternating current, a photo-cell, luminous electrodes connected to said source for alternately providing beams of light, one or the other of which depending upon the sense of unbalance of said system is transmitted to said photo-cell, and means for amplifying the output of said photo-cell to supply current to the other motor winding whose phase relation with respect to the current in the first winding is determined by the unbalance of said system to effect rotation of said motor in a sense to restore balance.

HENRY L. BERNARDE.